(12) United States Patent
Suzuki et al.

(10) Patent No.: US 11,359,574 B1
(45) Date of Patent: Jun. 14, 2022

(54) ENGINE CYLINDER HEAD

(71) Applicant: Mazda Motor Corporation, Hiroshima (JP)

(72) Inventors: Yohei Suzuki, Aki-gun (JP); Yasushi Nakahara, Aki-gun (JP); Tsuyoshi Yamamoto, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 17/454,095

(22) Filed: Nov. 9, 2021

(30) Foreign Application Priority Data

Dec. 16, 2020 (JP) .............................. JP2020-208618

(51) Int. Cl.
*F02F 1/40* (2006.01)
*F02F 1/38* (2006.01)
*F02F 1/42* (2006.01)
*F02F 1/24* (2006.01)

(52) U.S. Cl.
CPC ................ *F02F 1/40* (2013.01); *F02F 1/242* (2013.01); *F02F 1/38* (2013.01); *F02F 1/4214* (2013.01)

(58) Field of Classification Search
CPC ...... F02F 1/40; F02F 1/242; F02F 1/36; F02F 1/38; F02F 1/4214; F01P 3/00; F01P 3/02; F01P 2003/024; F01P 2025/04; F01P 2025/06; F02B 77/085
See application file for complete search history.

(56) References Cited

U.S. PATENT DOCUMENTS

| | | | | |
|---|---|---|---|---|
| 10,464,125 B1 * | 11/2019 | Kollock | ..................... | B22C 9/10 |
| 10,927,785 B2 * | 2/2021 | Wakasa | ................... | F02D 35/00 |
| 11,045,869 B1 * | 6/2021 | Kollock | ................... | F02F 1/243 |
| 2006/0137655 A1 * | 6/2006 | Dordet | .................... | F23Q 7/001 123/145 A |
| 2017/0254298 A1 * | 9/2017 | Beyer | ........................ | F02F 1/40 |
| 2019/0128212 A1 * | 5/2019 | Polonowski | ............ | F02N 19/04 |

FOREIGN PATENT DOCUMENTS

| | | | | |
|---|---|---|---|---|
| JP | 05312096 A | * | 11/1993 | ................ F02F 1/24 |
| JP | 6558404 B2 | | 8/2019 | |
| WO | 2018158951 A1 | | 9/2018 | |

* cited by examiner

*Primary Examiner* — Grant Moubry
(74) *Attorney, Agent, or Firm* — Alleman Hall Creasman & Tuttle LLP

(57) ABSTRACT

A cylinder head of a multi-cylinder engine is provided, the cylinder head including a plurality of ceiling parts for respective cylinders, and a water jacket. Each ceiling part is connected to an intake port including a primary port and a secondary port aligned in a cylinder-row direction, and is attached with an in-cylinder pressure sensor. A plug is attached to a hollow part of the cylinder head corresponding to a core print provided to a core of the water jacket, and is disposed at a position corresponding to a location between certain cylinders. The in-cylinder pressure sensor is attached at a position on an opposite side from the plug with respect to a cylinder center axis in the cylinder-row direction. Positions of the primary and secondary ports connected to each ceiling part are interchanged in the cylinder-row direction according to the position of the in-cylinder pressure sensor.

20 Claims, 5 Drawing Sheets

ENGINE CYLINDER HEAD

TECHNICAL FIELD

The technology disclosed herein relates to a structure of an engine cylinder head.

BACKGROUND OF THE DISCLOSURE

WO2018/158951A1 discloses an intake port structure of a multi-cylinder engine. The intake port has a primary port and a secondary port connected to each of a plurality of cylinders. The primary port and the secondary port in each cylinder are aligned in a row direction of the cylinders. That is, the primary port is positioned on one side, and the secondary port is positioned on the other side of the center axis of the cylinder in the row direction of the cylinders. In the multi-cylinder engine of WO2018/158951A1, the positioning order of the primary port and the secondary port is the same in the plurality of cylinders.

The primary port and the secondary port have different shapes, and thus, a given intake flow is generated inside the cylinder. For example, a swirl flow is generated inside the cylinder, in a direction in which intake air flowed-in from the primary port flows toward an exhaust port along a liner of the cylinder, and then returns to the primary port.

JP6,558,404B2 discloses a multi-cylinder engine with another structure. In this multi-cylinder engine, a swirl control valve is provided only to a secondary port among a primary port and a secondary port. When the swirl control valve is closed, a flow rate of intake air through the secondary port relatively decreases. When the swirl control valve is closed, a strong swirl flow is generated inside a cylinder in a direction in which intake air flowed in from the primary port flows one round along a liner of the cylinder, and returns to the primary port.

Moreover, in the multi-cylinder engine disclosed in JP6,558,404B2, an in-cylinder pressure sensor is attached to each cylinder. The in-cylinder pressure sensor measures a change in the pressure inside the cylinder. A combustion state in each cylinder is obtained based on the measurement result of the in-cylinder pressure sensor. In the multi-cylinder engine disclosed in JP6,558,404B2, the in-cylinder pressure sensor is attached to a cylinder head to be oriented along the center axis of each cylinder. In order to avoid measurement deviation among the plurality of cylinders, the attachment positions of the in-cylinder pressure sensors are required to be the same in the plurality of cylinders.

Meanwhile, a core print of a core used for casting a water jacket, which is required when a cylinder head of a multi-cylinder engine is manufactured, may be disposed at a position corresponding to a location between certain cylinders among a plurality of cylinders. In the manufactured cylinder head, the position where the core print is disposed becomes a hollow part, and for example, a plug is attached to the hollow part to close it, and forms a part of the water jacket.

Here, in order to avoid interference between an in-cylinder pressure sensor and the plug, the in-cylinder pressure sensor needs to be attached to a position opposite from the plug with respect to the center axis of the cylinder in the row direction. However, when avoiding the interference between the in-cylinder pressure sensor and the plug, the attachment positions of the in-cylinder pressure sensors may not be the same between the plurality of cylinders, which may lead to deviation in the measurement by the in-cylinder pressure sensors among the plurality of cylinders.

SUMMARY OF THE DISCLOSURE

Therefore, one purpose of the present disclosure is to reduce, in a multi-cylinder engine, deviation in measurement by in-cylinder pressure sensors attached to a plurality of cylinders, respectively.

In the technology disclosed herein, the attachment position of the in-cylinder pressure sensor to each cylinder is defined to be a given position with respect to a direction in which intake air flows inside the cylinder, and the relationship between the intake air direction and the attachment position of the in-cylinder pressure sensor is set to be the same in the plurality of cylinders.

According to one aspect of the present disclosure, a structure of a cylinder head of a multi-cylinder engine having a plurality of cylinders aligned in a row is provided.

The cylinder head includes a plurality of ceiling parts provided to the respective cylinders and each forming a part of a combustion chamber, and a water jacket formed inside the cylinder head. Each of the plurality of ceiling parts is connected to an intake port including a primary port and a secondary port aligned in the cylinder-row direction, and an in-cylinder pressure sensor configured to measure a pressure fluctuation inside the respective cylinder is attached to the ceiling part so as to face inside the cylinder. A plug is attached to a hollow part of the cylinder head corresponding to a core print provided to a core of the water jacket, the plug being disposed at a position corresponding to a location between certain cylinders among the plurality of cylinders. The in-cylinder pressure sensor attached to the ceiling part of the cylinder adjacent to the plug is attached at a position on the opposite side from the plug with respect to the center axis of the cylinder in the cylinder-row direction. Positions of the primary port and the secondary port connected to each of the plurality of ceiling parts are interchanged in the cylinder-row direction according to the position of the in-cylinder pressure sensor attached to the ceiling part.

According to this structure, inside the cylinder head, the water jacket is formed and the in-cylinder pressure sensors are attached to the respective cylinders.

Inside the cylinder head, the hollow part is also formed, which corresponds to the core print of the core of the water jacket used in the manufacturing of the cylinder head. The plug is attached to the cylinder head to close the hollow part, and is disposed at the position corresponding to the location between certain cylinders among the plurality of cylinders.

The in-cylinder pressure sensor is attached to the cylinder head so as to avoid interference with the plug. Specifically, the in-cylinder pressure sensor attached to the ceiling part of the cylinder adjacent to the plug is attached at a position on the opposite side from the plug with respect to the center axis of the cylinder in the cylinder-row direction. This means that the attachment positions of the in-cylinder pressure sensors are not the same among the plurality of cylinders.

The primary port and the secondary port are connected to each cylinder, and they are aligned in the cylinder-row direction. A flow state inside the cylinder is defined by the intake air flowed into the cylinder from the primary port and the intake air flowed into the cylinder from the secondary port.

Moreover, the positions of the primary port and the secondary port connected to each of the plurality of ceiling parts are interchanged in the cylinder-row direction according to the position of the in-cylinder pressure sensor attached to the ceiling part. That is, the connecting position of the primary port and the secondary port to the ceiling part is determined based on the attachment position of the in-cylinder pressure sensor. The relative position of the connecting position of the primary port and the secondary port with respect to the attachment position of the in-cylinder pressure sensor is fixed between the plurality of cylinders. As a result, the relationship between the direction of the intake flow generated inside the cylinder and the position of the in-cylinder pressure sensor matches between the plurality of cylinders. Therefore, in the multi-cylinder engine with this configuration, deviation in measurements is reduced between the plurality of cylinders by the in-cylinder pressure sensors attached to the plurality of cylinders, respectively.

The cylinder head may further include an oil jacket formed inside the cylinder head. The core print may be configured to define a relative position between the core of the water jacket and a core of the oil jacket to be overlapped with each other in the axial direction of the cylinder. The plug may be one of a plurality of plugs disposed in the cylinder head in the cylinder-row direction.

According to this structure, the plurality of plugs, each provided to the position corresponding to the core print, are disposed in the cylinder head in the cylinder-row direction. That is, a plurality of core prints are also disposed in the cylinder-row direction in the manufacturing of the cylinder head. The core print defines the relative position of the two cores overlapped with each other in the cylinder axial direction. The plurality of core prints disposed in the cylinder-row direction make the core of the water jacket and the core of the oil jacket be stably arranged in a metal mold in the casting of the cylinder head. This is advantageous in improving the quality of the cylinder head.

In addition, in the cast cylinder head, the plurality of in-cylinder pressure sensors are disposed in the cylinder-row direction corresponding to the disposed plug such that each in-cylinder pressure sensor does not interfere with the plug. The attachment position of the in-cylinder pressure sensor varies between the plurality of cylinders. Accordingly, the arrangement order of the primary port and the secondary port varies between the plurality of cylinders.

For each cylinder, a spark plug configured to ignite a mixture gas inside the cylinder may be attached to the ceiling part at the central part of the cylinder.

According to this configuration, the spark plug and the in-cylinder pressure sensor are attached to each cylinder so as to avoid interference therebetween. Further, the spark plug is provided to the central part of the cylinder. Therefore, a flame can be propagated from the central part toward a peripheral part inside the cylinder, which is advantageous in improving fuel efficiency of the multi-cylinder engine.

For each cylinder, an injector configured to inject fuel into the cylinder may be attached to the ceiling part between the primary port and the secondary port.

According to this configuration, the injector and the in-cylinder pressure sensor are attached to each cylinder so as to avoid interference therebetween. Further, the fuel injected into the cylinder from the injector is spread inside the cylinder by the intake air flowed into the cylinder from the primary port and the secondary port. This is advantageous in improving the fuel efficiency and emission performance of the multi-cylinder engine.

For at least one of the plurality of cylinders, the secondary port may be closer to the in-cylinder pressure sensor and the primary port may be farther from the in-cylinder pressure sensor relative to each other, and a swirl flow may be generated inside the cylinder in a direction in which intake air flowed-in from the primary port flows a half round along a liner of the cylinder to reach the in-cylinder pressure sensor.

According to this configuration, the flame which spreads by riding on the swirl flow, grows while flowing a half round along the liner, and then, reaches near the in-cylinder pressure sensor. The in-cylinder pressure sensor can accurately measure a combustion state inside the cylinder.

For at least one of the plurality of cylinders, the primary port may be closer to the in-cylinder pressure sensor and the secondary port may be farther from the in-cylinder pressure sensor relative to each other, a swirl flow may be generated inside the cylinder in a direction in which intake air flowed-in from the primary port flows one round along a liner of the cylinder to return to the in-cylinder pressure sensor.

According to this configuration, the flame which spreads by riding on the swirl flow, grows while flowing one round along the liner, and then, reaches near the in-cylinder pressure sensor. The in-cylinder pressure sensor can accurately measure the combustion state inside the cylinder.

The positions of the primary port and the secondary port may alternate every other cylinder in the cylinder-row direction. The cylinders may include first through sixth cylinders aligned in this order in the cylinder-row direction. The in-cylinder pressure sensors may be disposed on a front side in the first, third, and fifth cylinders, and the in-cylinder pressure sensors may be disposed on a rear side in the second, fourth, and sixth cylinders. The primary ports may be disposed on the rear side, and the secondary ports may be disposed on the front side in the first, third, and fifth cylinders. The primary ports may be disposed on the front side, and the secondary ports may be disposed on the rear side in the second, fourth, and sixth cylinders.

DETAILED DESCRIPTION OF THE DISCLOSURE

Figure 1:
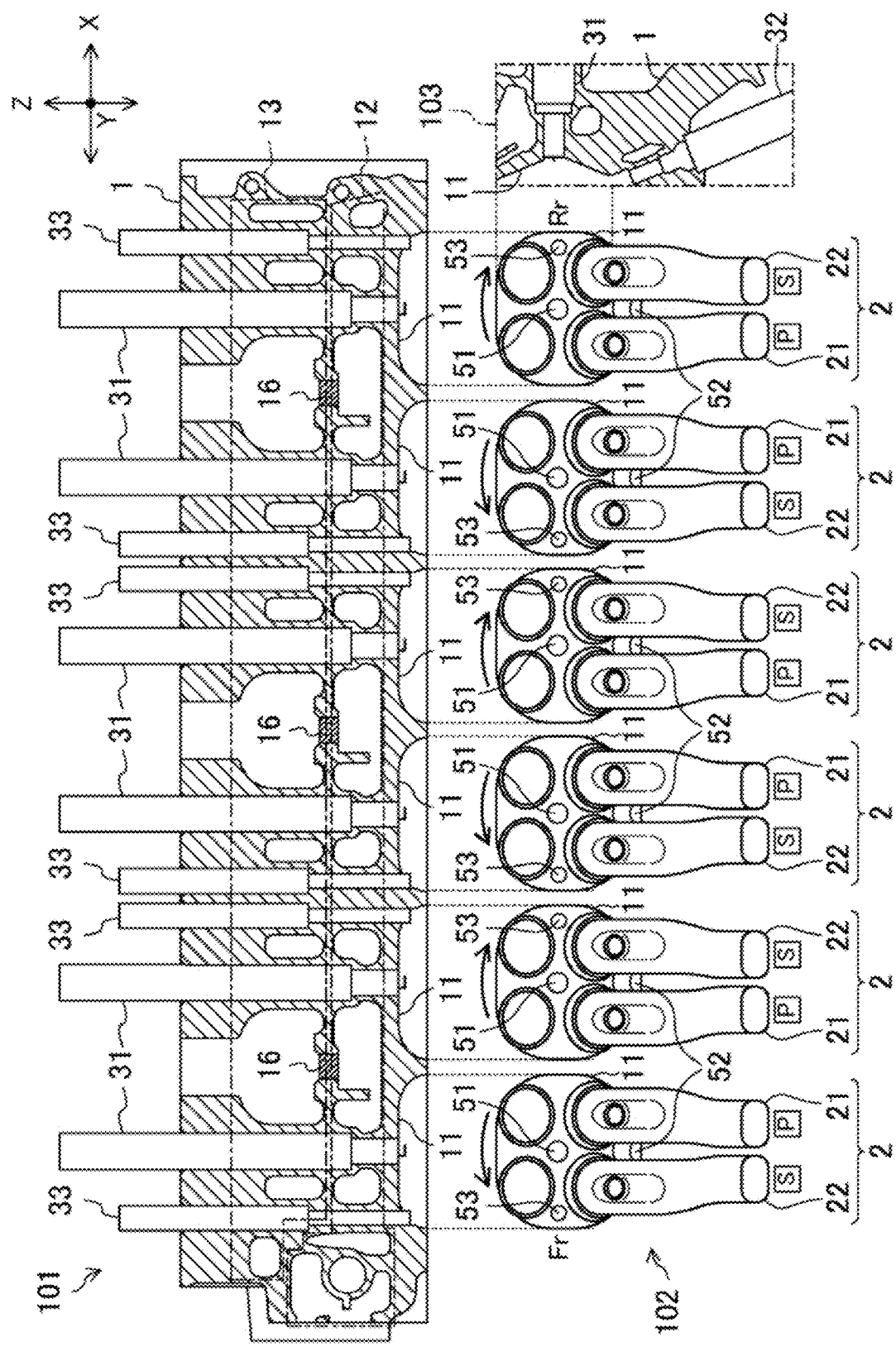
FIG. 1 is a view illustrating a structure of a cylinder head.
Figure 2:
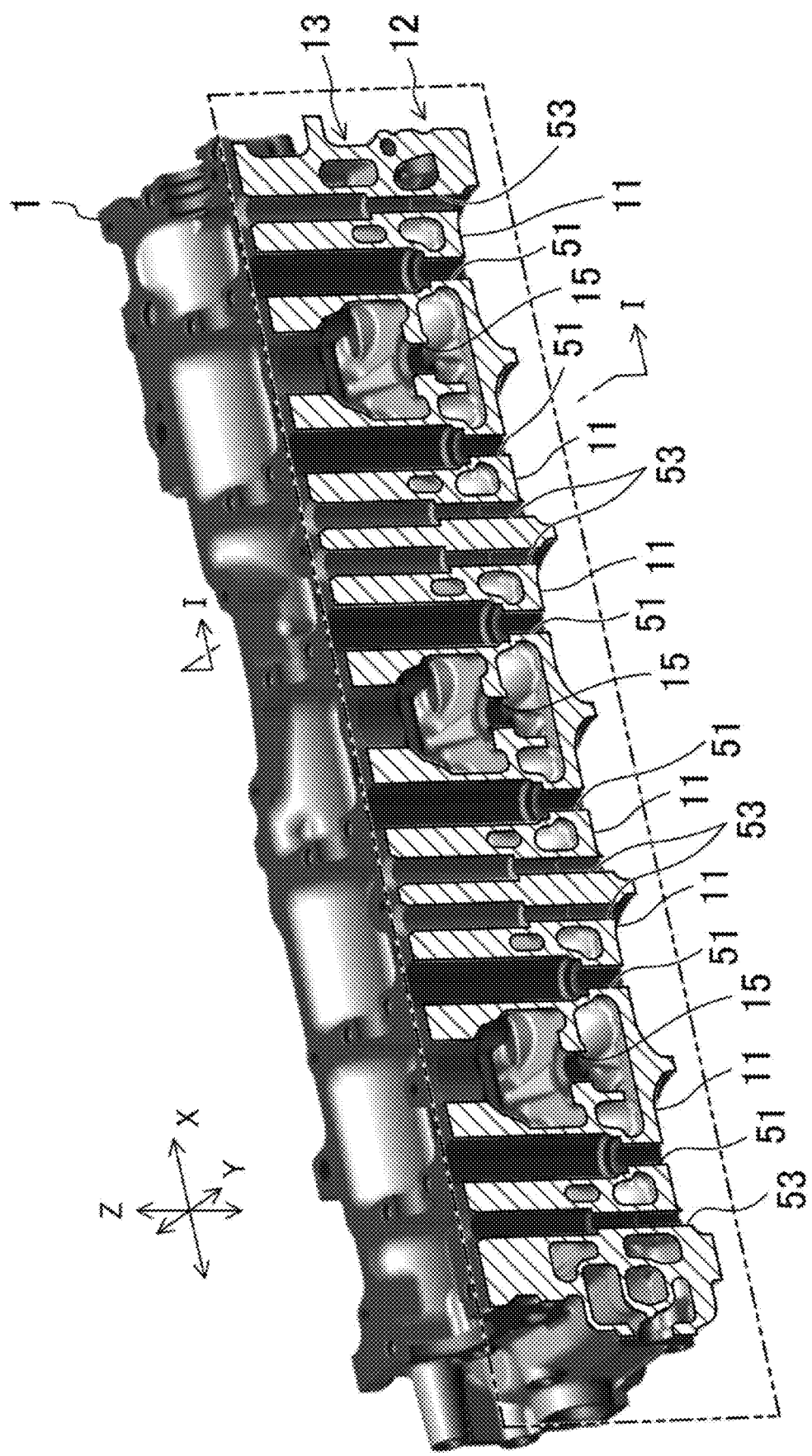
FIG. 2 is a perspective view illustrating a cross section of the cylinder head.

Hereinafter, one embodiment of a structure of an engine cylinder head is described with reference to the accompanying drawings. The cylinder head structure described herein is merely illustration. FIGS. 1 and 2 are views illustrating the cylinder head structure. FIG. 2 is a perspective view illustrating a longitudinal cross section of a cylinder head 1 along the center axes of cylinders of the engine. FIG. 1 includes (1) a view 101 illustrating the longitudinal cross section of the cylinder head 1, (2) a plan view 102 illustrating shapes of ceiling parts 11 and intake ports 2 provided to the cylinder head 1, and (3) a lateral cross-sectional view 103 of the cylinder head 1 taken along a line I-I in FIG. 2.

The engine is a multi-cylinder engine having a plurality of cylinders. In this example, the engine is a six-cylinder engine with six cylinders. The six cylinders are aligned in a row in an extending direction of a crankshaft (not illustrated). This straight-six engine is comparatively long in the crankshaft direction. Although not illustrated, the engine is disposed so-called "longitudinally" inside an engine bay. Note that in FIG. 2, the left side of the drawing sheet corresponds to the front side of the engine, and the right side of the drawing sheet corresponds to the rear side of the engine.

Below, the extending direction of the crankshaft is referred to as an "X-direction," and directions perpendicular to the X-direction are referred to as a "Y-direction" and a "Z-direction" (see FIG. 1). The X-direction corresponds to the row direction of the cylinders, the Y-direction corresponds to a direction connecting an intake side to an exhaust side of the engine, and the Z-direction corresponds to the direction of the center axis of the cylinder. Moreover, the six cylinders aligned in the X-direction may each be referred to as "a first cylinder," "a second cylinder," "a third cylinder," "a fourth cylinder," "a fifth cylinder," and "a sixth cylinder," in this order from the front side to the rear side.

The cylinder head 1 is placed on a cylinder block (not illustrated). The six cylinders are formed in the cylinder block. The cylinder head 1 has ceiling parts 11 corresponding to the cylinders. Each ceiling part 11 closes one end part of the cylinder. The ceiling part 11 forms a combustion chamber, together with the cylinder and a piston (not illustrated) which is inserted into the cylinder. As illustrated in the lateral cross-sectional view 103 of FIG. 1, the ceiling part 11 has a so-called pent-roof shape with a slope in the Y-direction. A ridge of each ceiling part 11, where sloped surfaces intersect with each other, extends in the X-direction at the central part of the cylinder.

Moreover, the cylinder head 1 is provided with a plurality of intake ports 2 and a plurality of exhaust ports (not illustrated). The intake port 2 and the exhaust port are connected to each of the plurality of cylinders. Each intake port 2 is provided to the cylinder head 1 on one side of the center axis of the cylinder in the Y-direction (i.e., the lower side in the plan view 102 of FIG. 1) to be connected to the sloped ceiling surface. Each exhaust port is provided to the cylinder head 1 on the other side of the center axis of the cylinder in the Y-direction (i.e., the upper side in the plan view 102 of FIG. 1) to be connected to the sloped ceiling surface. The engine is a crossflow type in which intake air and exhaust gas flow one way in the Y-direction.

The intake port 2 connected to one cylinder includes a primary port 21 and a secondary port 22. The primary port 21 and the secondary port 22 are aligned in the X-direction. The primary port 21 and the secondary port 22 are formed in the different shapes so that intake air flowed into the cylinder from the primary port 21 and the secondary port 22 forms a given flow inside the cylinder.

Moreover, although illustration is omitted, an intake passage connected to the secondary port 22 is provided with a swirl control valve. An intake passage connected to the primary port 21 is not provided with a swirl control valve. When the swirl control valve is closed, intake air flowed into the cylinder from the secondary port 22 is restricted, and intake air flowed into the cylinder from the primary port 21 increases relatively. As a result, a swirl flow which swirls in a given direction is generated inside the cylinder, in detail, in a direction in which the intake air flowed-in from the primary port 21 flows toward the exhaust port along the liner of the cylinder, and returns to the primary port 21. By adjusting the opening of the swirl control valve, the intensity of the swirl flow generated inside the cylinder can be controlled. Note that the swirl control valve may be omitted. Even if the engine is not provided with a swirl control valve, it may have the primary port 21 and the secondary port 22 so as to generate a swirl flow in a given direction.

Note that details of layout of the primary ports 21 and the secondary ports 22 in the plurality of cylinders will be described later.

Spark plugs 31 are attached to the cylinder head 1 so that the spark plugs 31 forcibly ignite a mixture gas inside the respective cylinders. The spark plug 31 is attached to each of the plurality of ceiling parts 11. For example, the spark plug 31 is disposed along the Z-direction. As illustrated in the plan view 102 of FIG. 1 or FIG. 2, the ceiling part 11 is provided with a first attaching part 51 to which the spark plug 31 is attached. The first attaching part 51 is provided to the central part of the ceiling part 11. An electrode of the spark plug 31 faces inside of the cylinder at the central part of the cylinder. Since a flame can be propagated from the central part toward a peripheral part inside the cylinder by the spark plug 31 being provided to the central part of the cylinder, it is advantageous in improving fuel efficiency of the multi-cylinder engine.

Injectors 32 are attached to the cylinder head 1 so that each injector 32 injects fuel into the corresponding cylinder. The injector 32 is disposed between the primary port 21 and the secondary port 22. In more detail, the injector 32 is disposed inclinedly with respect to the Z-direction. As illustrated in the plan view 102 of FIG. 1, the ceiling part 11 is provided with a second attaching part 52 to which the injector 32 is attached, between the primary port 21 and the secondary port 22. On the intake side of the cylinder, a nozzle hole of the injector 32 faces the inside of the cylinder. The fuel injected into the cylinder from the injector 32 is spread inside the cylinder by the intake air flowed into the cylinder from the primary port 21 and the secondary port 22. This is advantageous in improving the fuel efficiency and emission performance of the multi-cylinder engine.

Note that the layout structure of the spark plug 31 and the injector 32 illustrated in FIGS. 1 and 2 is one example. For example, the disposed position of the spark plug 31 and the disposed position of the injector 32 may be switched. Alternatively, both of the spark plug 31 and the injector 32 may be attached to the central part of the ceiling part 11.

In-cylinder pressure sensors 33 are attached to the cylinder head 1 so that the in-cylinder pressure sensors 33 measure a change in the pressure (pressure fluctuation) inside the respective cylinders. A combustion state inside the cylinder can be grasped based on a measurement signal of the in-cylinder pressure sensor 33. In more detail, the in-cylinder pressure sensor 33 is disposed along the Z-direction. As illustrated in the plan view 102 of FIG. 1 and FIG. 2, the ceiling part 11 is provided, on its ridge, with a third attaching part 53 to which a sensing part of the in-cylinder pressure sensor 33 is attached. The sensing part faces the inside of the cylinder on the ridge. The in-cylinder pressure sensor 33 is provided to each of the plurality of ceiling parts 11 to be disposed on one side of the central part of the cylinder in the X-direction. The disposed position of the in-cylinder pressure sensor 33 will be described later in detail.

The cylinder head 1 is formed therein with a water jacket 12 and an oil jacket 13. Coolant flows inside the water jacket 12, and lubricant oil flows inside the oil jacket 13.

The water jacket 12 is provided inside the cylinder head 1 above the ceiling part 11. The water jacket 12 extends in the X-direction. The oil jacket 13 is provided above the water jacket 12. The oil jacket 13 also extends in the X-direction.

Figure 3:
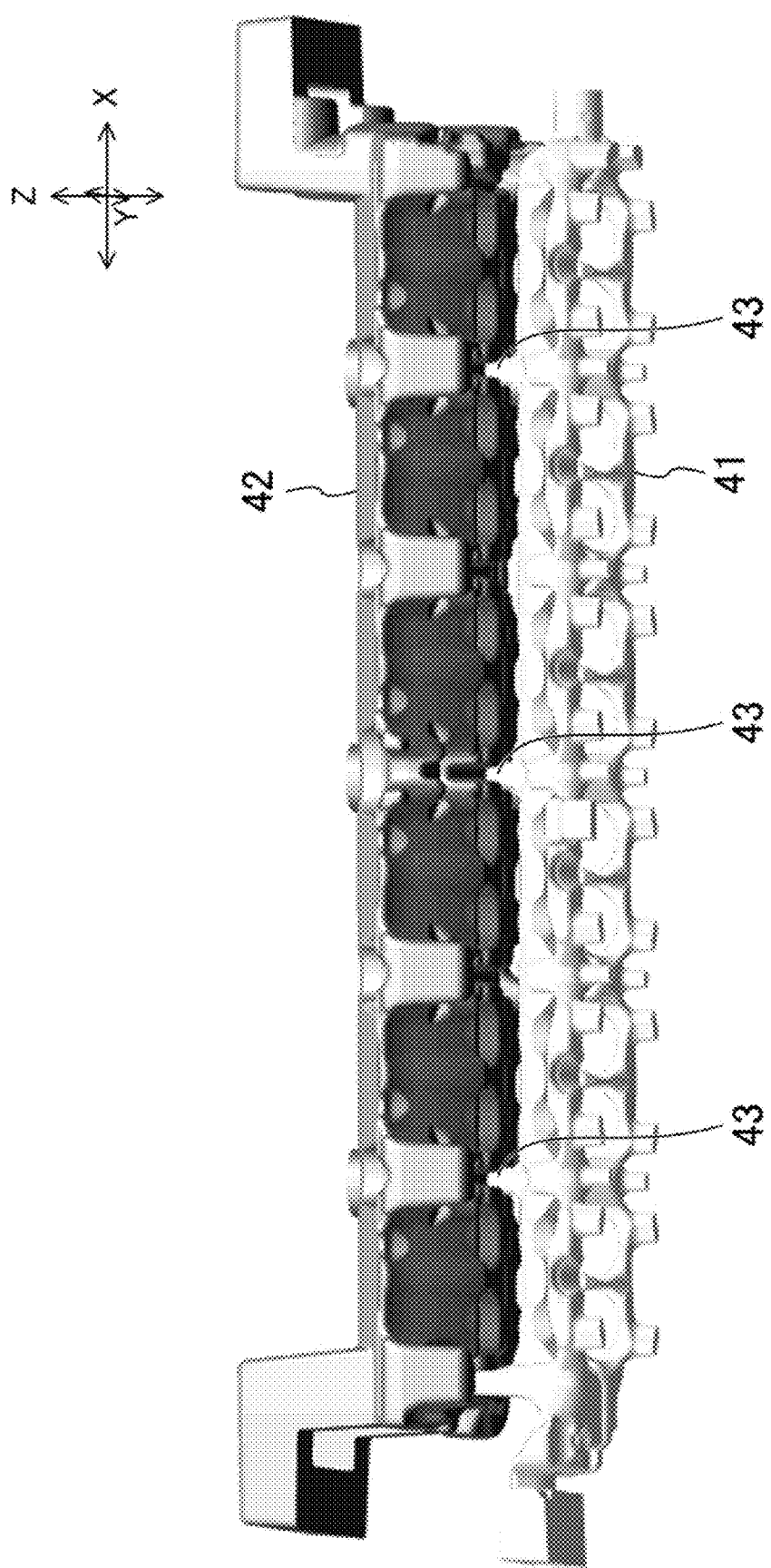
FIG. 3 is a side view of a core of a water jacket and a core of an oil jacket.
Figure 4:
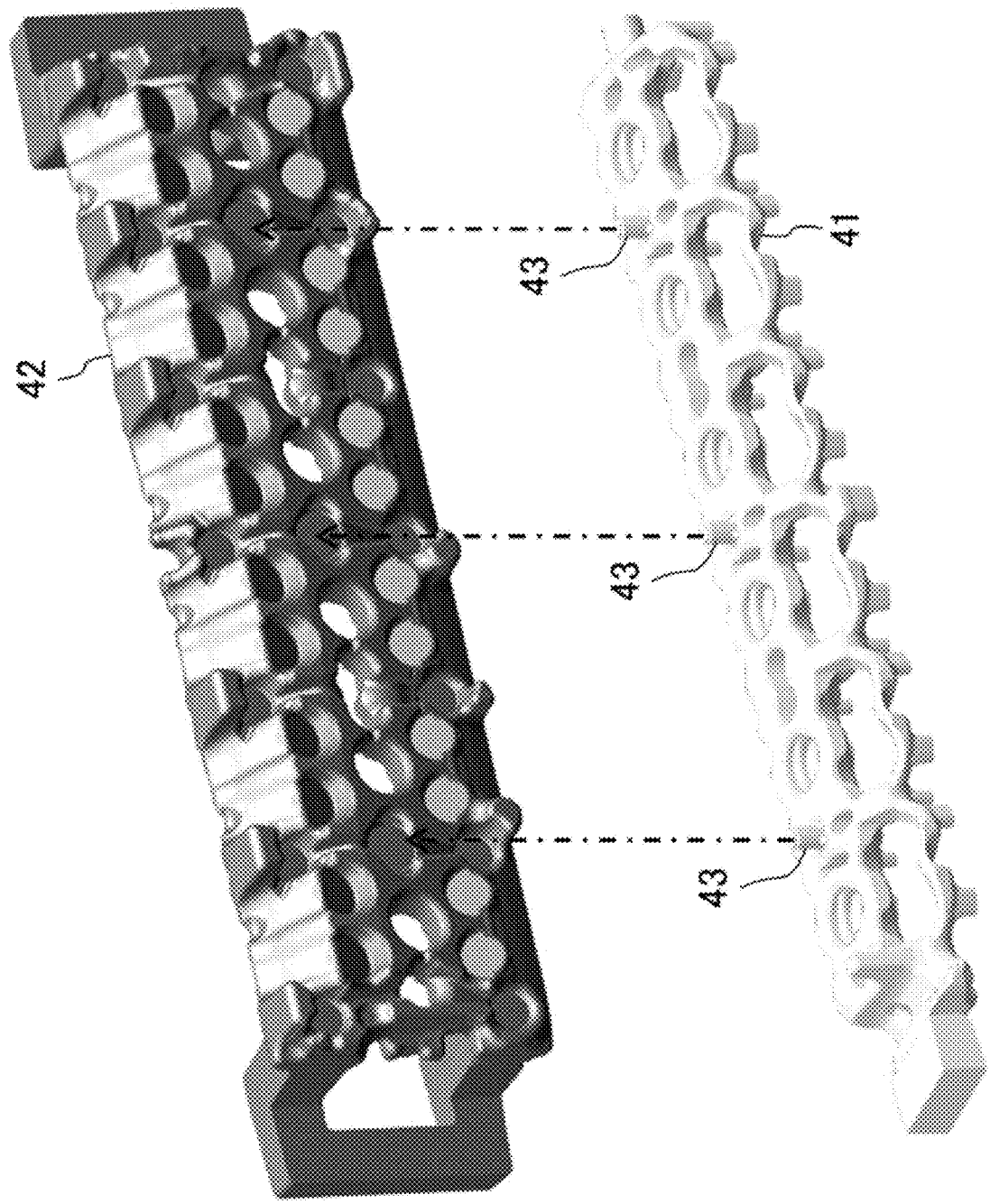
FIG. 4 is an exploded perspective view illustrating the core of the water jacket and the core of the oil jacket.

The cylinder head 1 is manufactured by casting. The water jacket 12 and the oil jacket 13 are formed by cores. FIGS. 3 and 4 illustrate a first core 41 which is a core of the water jacket, and a second core 42 which is a core of the oil jacket. The first core 41 and the second core 42 have given shapes both extending in the X-direction. As illustrated in FIG. 3, the second core 42 is placed on the first core 41 during the casting of the cylinder head 1. The first core 41 has a plurality of core prints 43 each formed to protrude upwardly from a body of the first core 41. The plurality of core prints 43 support the second core 42, as well as defining the relative position between the first core 41 and the second core 42 as indicated by arrows in FIG. 4.

The plurality of core prints 43 are disposed equally or substantially equally in the X-direction in the first core 41 which extends in the X-direction. In this example, the first core 41 has three core prints 43. The three core prints 43 are located in the cast cylinder head 1 at positions corresponding to locations between the first cylinder and the second cylinder, between the third cylinder and the fourth cylinder, and between the fifth cylinder and the sixth cylinder, respectively. For example, the core is not disposed on the front side of the first cylinder, or on the rear side of the sixth cylinder. Since the plurality of core prints 43 are equally or substantially equally disposed in the X-direction, the second core 42 is stably supported by the first core 41, and the positioning accuracy between the first core 41 and the second core 42 is also improved. As described above, the engine is the straight-six engine, and the cylinder head 1 is elongated in the X-direction. Disposing the plurality of core prints 43 equally or substantially equally in the X-direction improves a shaping accuracy of the water jacket 12 and the oil jacket 13 in the cylinder head 1 which is elongated in the X-direction. As a result, manufacturing quality of the cylinder head 1 improves.

As illustrated in FIG. 2, a position in the cast cylinder head 1 corresponding to the core print 43 constitutes a hollow part 15. The hollow part 15 communicates the water jacket 12 with the oil jacket 13. As illustrated in the longitudinal cross-sectional view 101 of FIG. 1, a blind plug 16 is attached to each hollow part 15. The blind plugs 16 close the hollow parts 15. The blind plugs 16 forms a part of the water jacket 12 as well as a part of the oil jacket 13. Since the blind plugs 16 correspond to each of the three core prints 43, the blind plugs 16 are located in the cylinder head 1 at the positions corresponding to the locations between the first cylinder and the second cylinder, between the third cylinder and the fourth cylinder, and between the fifth cylinder and the sixth cylinder, respectively.

The in-cylinder pressure sensor 33 described above is disposed so as to avoid interference with the blind plug 16. For example, in the first cylinder adjacent to the blind plug 16, the in-cylinder pressure sensor 33 is disposed on the front side opposite from the blind plug 16 with respect to the center axis of the cylinder in the X-direction. In the second cylinder adjacent to the blind plug 16, the in-cylinder pressure sensor 33 is disposed on the rear side opposite from the blind plug 16 with respect to the center axis of the cylinder in the X-direction.

Similarly, in the third cylinder, the in-cylinder pressure sensor 33 is disposed on the front side (i.e., the opposite side from the blind plug 16 with respect to the center axis of the cylinder) in the X-direction. Further, in the fourth cylinder, the in-cylinder pressure sensor 33 is disposed on the rear side (i.e., the opposite side from the blind plug 16 with respect to the center axis of the cylinder) in the X-direction.

Similarly, in the fifth cylinder, the in-cylinder pressure sensor 33 is disposed on the front side (i.e., the opposite side from the blind plug 16 with respect to the center axis of the cylinder) in the X-direction. Further, in the sixth cylinder, the in-cylinder pressure sensor 33 is disposed on the rear side (i.e., the opposite side from the blind plug 16 with respect to the center axis of the cylinder) in the X-direction.

Therefore, in the first, third, and fifth cylinders, the in-cylinder pressure sensors 33 are disposed on the front side, and in the second, fourth, and sixth cylinders, the in-cylinder pressure sensors 33 are disposed on the rear side.

As described above, a flow state in each cylinder (e.g., a swirling direction of the swirl flow) is defined according to the positioning order of the primary port 21 and the secondary port 22. Suppose that the positioning order of the primary port 21 and the secondary port 22 in the X-direction is the same for all of the plurality of cylinders, and the swirling direction of the swirl flow is the same for all of the plurality of cylinders. Then, since the positions of the in-cylinder pressure sensors 33 in the plurality of cylinders are different, the relationship between the position of the in-cylinder pressure sensor 33 and the swirling direction of the swirl flow is different between the plurality of cylinders. Since measurement conditions of the in-cylinder pressure sensors 33 are different between the plurality of cylinders, deviation in the measurement by the in-cylinder pressure sensors 33 may occur between the plurality of cylinders.

In terms of this, in the structure of the engine cylinder head according to this embodiment, the positioning order of the primary port and the secondary port in each cylinder in the X-direction varies between the plurality of cylinders according to the position of the in-cylinder pressure sensor 33.

For example, the positions of the primary port 21 and the secondary port 22 may alternate every other cylinder in the cylinder-row direction. Thus, in the first cylinder, the primary port 21 is disposed on the rear side, and the secondary port 22 is disposed on the front side. In the second cylinder, the primary port 21 is disposed on the front side, and the secondary port 22 is disposed on the rear side. In the third cylinder, the primary port 21 is disposed on the rear side, and the secondary port 22 is disposed on the front side. In the fourth cylinder, the primary port 21 is disposed on the front side, and the secondary port 22 is disposed on the rear side. In the fifth cylinder, the primary port 21 is disposed on the rear side, and the secondary port 22 is disposed on the front side. In the sixth cylinder, the primary port 21 is disposed on the front side, and the secondary port 22 is disposed on the rear side.

Therefore, in each of the cylinders, the intake port 2 closer to the in-cylinder pressure sensor 33 is the secondary port 22, and the intake port 2 farther from the in-cylinder pressure sensor 33 is the primary port 21, relative to each other. As indicated by arrows in FIG. 1, a swirl flow is generated inside each cylinder, in a direction in which intake air flowed-in from the primary port 21 flows a half round along the liner of the cylinder to reach the in-cylinder pressure sensor 33.

The relationship between the position of the in-cylinder pressure sensor 33 and the swirling direction of the swirl flow matches between the plurality of cylinders, and thus, the measurement conditions of the in-cylinder pressure sensors 33 are the same in the plurality of cylinders. As a result, the deviation in the measurement by the in-cylinder pressure sensors 33 between the plurality of cylinders is reduced.

Moreover, the flame which spreads by riding on the swirl flow, grows while flowing a half round along the liner, and then, reaches near the in-cylinder pressure sensor 33. Each in-cylinder pressure sensor 33 can accurately measure the combustion state inside the cylinder.

Note that according to a modification, the positions of the primary port 21 and the secondary port 22 may be reversed in each cylinder (not illustrated). That is, in the first cylinder, the primary port 21 may be disposed on the front side, and the secondary port 22 may be disposed on the rear side. In the second cylinder, the primary port 21 may be disposed on the rear side, and the secondary port 22 may be disposed on the front side. In the third cylinder, the primary port 21 may be disposed on the front side, and the secondary port 22 may be disposed on the rear side. In the fourth cylinder, the primary port 21 may be disposed on the rear side, and the secondary port 22 may be disposed on the front side. In the fifth cylinder, the primary port 21 may be disposed on the front side, and the secondary port 22 may be disposed on the rear side. In the sixth cylinder, the primary port 21 may be disposed on the rear side, and the secondary port 22 may be disposed on the front side.

Also in this modification, the relationship between the position of the in-cylinder pressure sensor 33 and the swirling direction of the swirl flow matches between the plurality of cylinders, and thus, the measurement conditions of the in-cylinder pressure sensors 33 are the same in the plurality of cylinders. As a result, the deviation in the measurement by the in-cylinder pressure sensors 33 between the plurality of cylinders is reduced.

Moreover, according to this modification, the flame which spreads by riding on the swirl flow, grows while flowing one round along the liner, and then, reaches near the in-cylinder pressure sensor 33. Each in-cylinder pressure sensor 33 can accurately measure the combustion state inside the cylinder.

Figure 5:
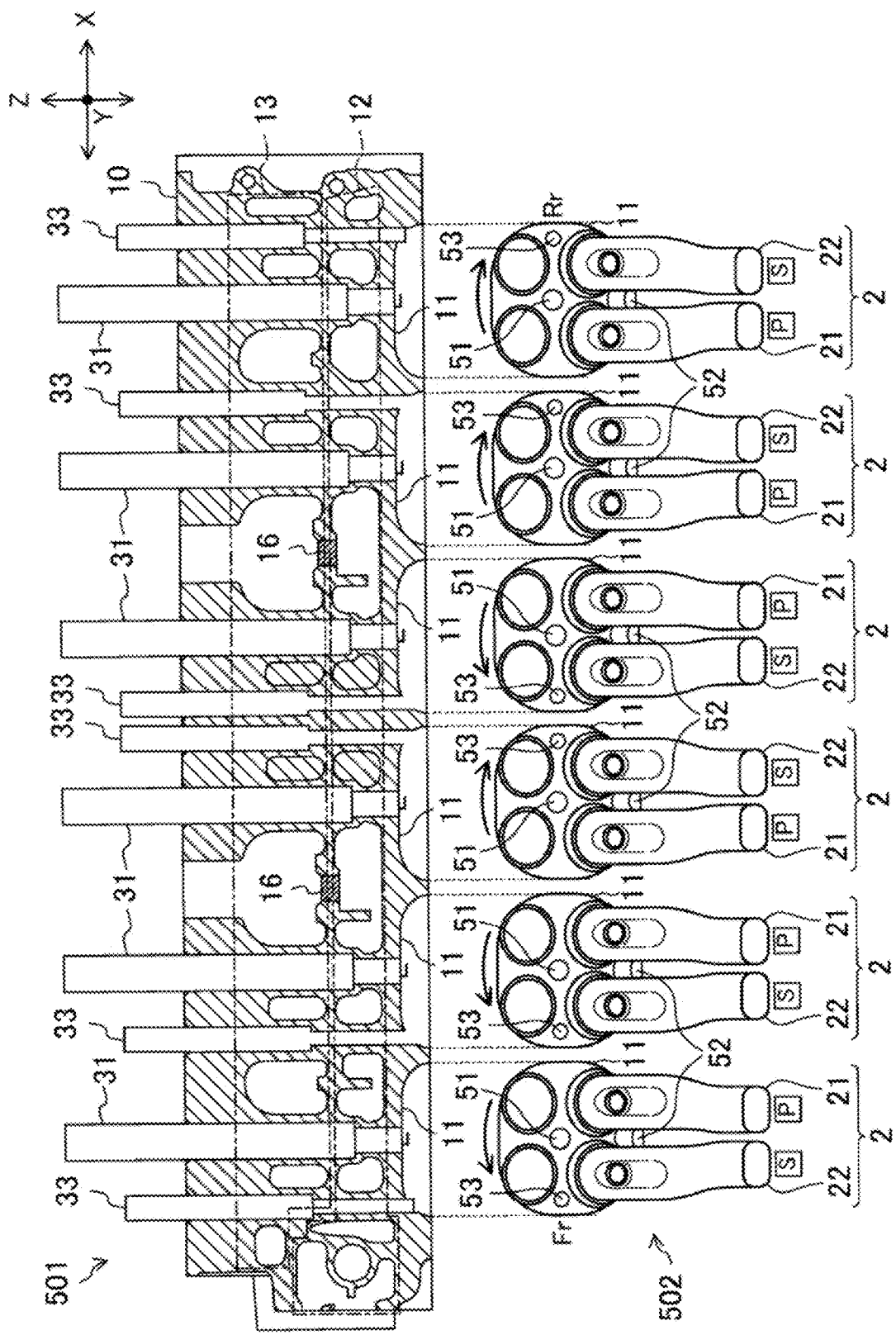
FIG. 5 is a view illustrating a modification of the structure of the cylinder head corresponding to FIG. 1.

FIG. 5 illustrates another modification of the cylinder head structure, in which the positions of the core prints 43 of the first core 41 are different from the embodiment described above. Accordingly, the positions of the blind plugs 16 in a cylinder head 10 are different from the structure of FIG. 1.

In more detail, as illustrated in a longitudinal cross-sectional view 501 and a plan view 502 of FIG. 5, the blind plugs 16 are provided to the cylinder head 10 between the second cylinder and the third cylinder, and between the fourth cylinder and the fifth cylinder. Although illustration is omitted, the first core 41 which is the core of the water jacket has two core prints 43.

In the cylinder head 10 of FIG. 5, in the second cylinder adjacent to the blind plug 16, the in-cylinder pressure sensor 33 is disposed on the front side (i.e., the opposite side from the blind plug 16 with respect to the center axis of the cylinder) in the X-direction. In the third cylinder, the in-cylinder pressure sensor 33 is disposed on the rear side (i.e., the opposite side from the blind plug 16 with respect to the center axis of the cylinder) in the X-direction. Similarly, in the fourth cylinder adjacent to the blind plug 16, the in-cylinder pressure sensor 33 is disposed on the front side (i.e., the opposite side from the blind plug 16 with respect to the center axis of the cylinder) in the X-direction. In the fifth cylinder, the in-cylinder pressure sensor 33 is disposed on the rear side (i.e., the opposite side from the blind plug 16 with respect to the center axis of the cylinder) in the X-direction. Note that in the first cylinder which is not adjacent to the blind plug 16, the in-cylinder pressure sensor 33 may be disposed on either the front side or the rear side since the pressure sensor 33 does not interfere with the blind plug 16. In FIG. 5, the in-cylinder pressure sensor 33 is disposed on the front side as one example. Moreover, the sixth cylinder is also not adjacent to the blind plug 16, and thus, the in-cylinder pressure sensor 33 may be disposed on either the front side or the rear side. In FIG. 5, the in-cylinder pressure sensor 33 is disposed on the rear side as one example.

Moreover, also in this structure of the engine cylinder head, the arrangement order of the primary port and the secondary port in each cylinder in the X-direction varies between the plurality of cylinders according to the position of the in-cylinder pressure sensor 33.

In detail, in the first cylinder, the primary port 21 is disposed on the rear side, and the secondary port 22 is disposed on the front side. In the second cylinder, the primary port 21 is disposed on the rear side, and the secondary port 22 is disposed on the front side. In the third cylinder, the primary port 21 is disposed on the front side, and the secondary port 22 is disposed on the rear side. In the fourth cylinder, the primary port 21 is disposed on the rear side, and the secondary port 22 is disposed on the front side. In the fifth cylinder, the primary port 21 is disposed on the front side, and the secondary port 22 is positioned on the rear side. In the sixth cylinder, the primary port 21 is disposed on the front side, and the secondary port 22 is disposed on the rear side.

Therefore, in each of the cylinders, the intake port 2 near the in-cylinder pressure sensor 33 is the secondary port 22, and the intake port 2 far from the in-cylinder pressure sensor 33 is the primary port 21. Since the measurement conditions of the in-cylinder pressure sensors 33 are the same in the plurality of cylinders, the deviation in the measurement by the in-cylinder pressure sensors 33 between the plurality of cylinders is reduced.

Note that in the cylinder head 10 of FIG. 5, the positions of the primary port 21 and the secondary port 22 in each cylinder may be reversed from the example in FIG. 5.

Moreover, when the first core 41 includes two core prints 43, the two core prints 43 may be positioned variously. For example, although illustration is omitted, the two core prints 43 may be provided to the positions corresponding to the locations between the first cylinder and the second cylinder, and between the fifth cylinder and the sixth cylinder, respectively. Alternatively, the two core prints 43 may be provided to the positions corresponding to the locations between the first cylinder and the second cylinder, and between the third cylinder and the fourth cylinder, respectively. Alternatively, the two core prints 43 may be provided to the positions corresponding to the locations between the second cylinder and the third cylinder, and between the fifth cylinder and the sixth cylinder, respectively.

In any layout example, the in-cylinder pressure sensor 33 is attached on the front side or the rear side in the X-direction in each cylinder such that the in-cylinder pressure sensor 33 does not interfere with the blind plug 16, and the positions of the primary port 21 and the secondary port 22 in the X-direction are interchanged according to the attachment position of the in-cylinder pressure sensor 33.

Note that the technology disclosed herein is not limited to be applied to a cylinder head of a straight-six engine, but may be applied to a cylinder head of a straight multi-cylinder engine including a straight-four engine. The technology disclosed herein is widely applicable to a cylinder head of an engine in which a plurality of cylinders are arrayed.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Cylinder Head
10 Cylinder Head
11 Ceiling Part
12 Water Jacket
13 Oil Jacket
16 Blind Plug
2 Intake Port
21 Primary Port
22 Secondary Port
31 Spark Plug
32 Injector
33 In-cylinder Pressure Sensor
41 First Core (Core of Water Jacket)
42 Second Core (Core of Oil Jacket)
43 Core Print

What is claimed is:

1. A cylinder head of a multi-cylinder engine having a plurality of cylinders aligned in a row, the cylinder head comprising:
   a plurality of ceiling parts provided to the respective cylinders and each forming a part of a combustion chamber; and
   a water jacket formed inside the cylinder head, wherein
   each of the plurality of ceiling parts is connected to an intake port including a primary port and a secondary port aligned in the cylinder-row direction, and an in-cylinder pressure sensor configured to measure a pressure fluctuation inside the respective cylinder is attached to the ceiling part so as to face inside the cylinder,
   a plug is attached to a hollow part of the cylinder head corresponding to a core print provided to a core of the water jacket, the plug being disposed at a position corresponding to a location between certain cylinders among the plurality of cylinders,
   the in-cylinder pressure sensor attached to the ceiling part of the cylinder adjacent to the plug is attached at a position on an opposite side from the plug with respect to a center axis of the cylinder in the cylinder-row direction, and
   positions of the primary port and the secondary port connected to each of the plurality of ceiling parts are interchanged in the cylinder-row direction according to the position of the in-cylinder pressure sensor attached to the ceiling part.

2. The cylinder head of claim 1,
   wherein the cylinder head further comprises an oil jacket formed inside the cylinder head,
   wherein the core print is configured to define a relative position between the core of the water jacket and a core of the oil jacket to be overlapped with each other in the axial direction of the cylinder, and
   wherein the plug is one of a plurality of plugs disposed in the cylinder head in the cylinder-row direction.

3. The cylinder head of claim 2, wherein for each cylinder, a spark plug configured to ignite a mixture gas inside the cylinder is attached to the ceiling part at the central part of the cylinder.

4. The cylinder head of claim 3, wherein for each cylinder, an injector configured to inject fuel into the cylinder is attached to the ceiling part between the primary port and the secondary port.

5. The cylinder head of claim 4, wherein for at least one of the plurality of cylinders:
   the secondary port is closer to the in-cylinder pressure sensor and the primary port is farther from the in-cylinder pressure sensor relative to each other, and
   a swirl flow is generated inside the cylinder in a direction in which intake air flowed-in from the primary port flows a half round along a liner of the cylinder to reach the in-cylinder pressure sensor.

6. The cylinder head of claim 4, wherein for at least one of the plurality of cylinders:
   the primary port is closer to the in-cylinder pressure sensor and the secondary port is farther from the in-cylinder pressure sensor relative to each other, and
   a swirl flow is generated inside the cylinder in a direction in which intake air flowed-in from the primary port flows one round along a liner of the cylinder to return to the in-cylinder pressure sensor.

7. The cylinder head of claim 1, wherein for each cylinder, a spark plug configured to ignite a mixture gas inside the cylinder is attached to the ceiling part at the central part of the cylinder.

8. The cylinder head of claim 1, wherein for each cylinder, an injector configured to inject fuel into the cylinder is attached to the ceiling part between the primary port and the secondary port.

9. The cylinder head of claim 1, wherein for at least one of the plurality of cylinders:
   the secondary port is closer to the in-cylinder pressure sensor and the primary port is farther from the in-cylinder pressure sensor relative to each other, and
   a swirl flow is generated inside the cylinder in a direction in which intake air flowed-in from the primary port flows a half round along a liner of the cylinder to reach the in-cylinder pressure sensor.

10. The cylinder head of claim 1, wherein for at least one of the plurality of cylinders:
    the primary port is closer to the in-cylinder pressure sensor and the secondary port is farther from the in-cylinder pressure sensor relative to each other, and
    a swirl flow is generated inside the cylinder in a direction in which intake air flowed-in from the primary port flows one round along a liner of the cylinder to return to the in-cylinder pressure sensor.

11. The cylinder head of claim 2, wherein for each cylinder, an injector configured to inject fuel into the cylinder is attached to the ceiling part between the primary port and the secondary port.

12. The cylinder head of claim 2, wherein for at least one of the plurality of cylinders:
    the secondary port is closer to the in-cylinder pressure sensor and the primary port is farther from the in-cylinder pressure sensor relative to each other, and
    a swirl flow is generated inside the cylinder in a direction in which intake air flowed-in from the primary port flows a half round along a liner of the cylinder to reach the in-cylinder pressure sensor.

13. The cylinder head of claim 2, wherein for at least one of the plurality of cylinders:
    the primary port is closer to the in-cylinder pressure sensor and the secondary port is farther from the in-cylinder pressure sensor relative to each other, and a swirl flow is generated inside the cylinder in a direction in which intake air flowed-in from the primary port flows one round along a liner of the cylinder to return to the in-cylinder pressure sensor.

14. The cylinder head of claim 7, wherein for each cylinder, an injector configured to inject fuel into the cylinder is attached to the ceiling part between the primary port and the secondary port.

15. The cylinder head of claim 7, wherein for at least one of the plurality of cylinders:
the secondary port is closer to the in-cylinder pressure sensor and the primary port is farther from the in-cylinder pressure sensor relative to each other, and
a swirl flow is generated inside the cylinder in a direction in which intake air flowed-in from the primary port flows a half round along a liner of the cylinder to reach the in-cylinder pressure sensor.

16. The cylinder head of claim 7, wherein for at least one of the plurality of cylinders:
the primary port is closer to the in-cylinder pressure sensor and the secondary port is farther from the in-cylinder pressure sensor relative to each other, and
a swirl flow is generated inside the cylinder in a direction in which intake air flowed-in from the primary port flows one round along a liner of the cylinder to return to the in-cylinder pressure sensor.

17. The cylinder head of claim 8, wherein for at least one of the plurality of cylinders:
the secondary port is closer to the in-cylinder pressure sensor and the primary port is farther from the in-cylinder pressure sensor relative to each other, and
a swirl flow is generated inside the cylinder in a direction in which intake air flowed-in from the primary port flows a half round along a liner of the cylinder to reach the in-cylinder pressure sensor.

18. The cylinder head of claim 8, wherein for at least one of the plurality of cylinders:
the primary port is closer to the in-cylinder pressure sensor and the secondary port is farther from the in-cylinder pressure sensor relative to each other, and
a swirl flow is generated inside the cylinder in a direction in which intake air flowed-in from the primary port flows one round along a liner of the cylinder to return to the in-cylinder pressure sensor.

19. The cylinder head of claim 1, wherein the positions of the primary port and the secondary port alternate every other cylinder in the cylinder-row direction.

20. The cylinder head of claim 19,
wherein the cylinders include first through sixth cylinders aligned in this order in the cylinder-row direction,
wherein the in-cylinder pressure sensors are disposed on a front side in the first, third, and fifth cylinders, and the in-cylinder pressure sensors are disposed on a rear side in the second, fourth, and sixth cylinders,
wherein the primary ports are disposed on the rear side, and the secondary ports are disposed on the front side in the first, third, and fifth cylinders, and
wherein the primary ports are disposed on the front side, and the secondary ports are disposed on the rear side in the second, fourth, and sixth cylinders.

\* \* \* \* \*